United States Patent
Khandekar et al.

(10) Patent No.: US 8,855,062 B2
(45) Date of Patent: Oct. 7, 2014

(54) DYNAMIC SELECTION OF SUBFRAME FORMATS IN A WIRELESS NETWORK

(75) Inventors: Aamod Dinkar Khandekar, San Diego, CA (US); Ravi Palanki, San Diego, CA (US); Tingfang Ji, San Diego, CA (US); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 913 days.

(21) Appl. No.: 12/786,972

(22) Filed: May 25, 2010

(65) Prior Publication Data

US 2010/0303013 A1     Dec. 2, 2010

Related U.S. Application Data

(60) Provisional application No. 61/182,007, filed on May 28, 2009.

(51) Int. Cl.
| | |
|---|---|
| H04W 4/00 | (2009.01) |
| H04W 99/00 | (2009.01) |
| H04L 12/28 | (2006.01) |
| H04L 12/56 | (2006.01) |
| H04W 88/08 | (2009.01) |
| H04W 28/18 | (2009.01) |

(52) U.S. Cl.
CPC .............. *H04W 99/00* (2013.01); *H04W 88/08* (2013.01); *H04W 28/18* (2013.01)
USPC .......................................... 370/329; 370/392

(58) Field of Classification Search
USPC .................... 370/310–350, 389–394
See application file for complete search history.

(56) References Cited

U.S. PATENT DOCUMENTS

| | | |
|---|---|---|
| 2003/0123414 A1 | 7/2003 | Tong et al. |
| 2005/0216599 A1 | 9/2005 | Anderson et al. |

(Continued)

FOREIGN PATENT DOCUMENTS

| | | |
|---|---|---|
| CN | 101282170 A | 10/2008 |
| JP | 2008535392 A | 8/2008 |

(Continued)

OTHER PUBLICATIONS

3GPP TS 36.304,3rd Generation Partnership Project;Technical Specification Group Radio Access Network; Evolved Universal Terrestrial Radio Access (E-UTRA); User Equipment (UE) procedures in idle mode (Release 8) 3GPP Standard;, 3RD Generation Partnership Project (3GPP), Mobile Competence Centre ; 650, Route Des Lucioles ; F-06921 Sophia-Antipolis Cedex ; France, no. V8.6.0, r Jun. 1, 2009, pp. 1-30, XP050377598 paragraph 7.1, lines 1-4; p. 26.

(Continued)

*Primary Examiner* — Xavier Szewai Wong
(74) *Attorney, Agent, or Firm* — Larry Moskowitz

(57) ABSTRACT

Techniques for dynamically selecting subframe formats in a wireless network are described. In an aspect, a base station may dynamically switch between different subframe formats to support communication for different types of user equipments (UEs). In one design, the base station may declare a set of subframes as multicast/broadcast single frequency network (MBSFN) subframes for first/legacy UEs. The base station may send signaling conveying the set of subframes as MBSFN subframes to the legacy UEs. The base station may dynamically select the formats of the set of subframes for second/new UEs, e.g., on a per subframe basis. The format of each subframe may be selected from a plurality of formats, which may include at least one regular subframe format, at least one MBSFN subframe format, and/or at least one blank subframe format. The base station may send transmissions in the set of subframes based on the selected formats.

41 Claims, 9 Drawing Sheets

(56) References Cited

U.S. PATENT DOCUMENTS

| | | | |
|---|---|---|---|
| 2007/0019605 A1* | 1/2007 | Rioux et al. | 370/347 |
| 2007/0064669 A1 | 3/2007 | Classon et al. | |
| 2008/0049690 A1* | 2/2008 | Kuchibhotla et al. | 370/338 |
| 2008/0101280 A1 | 5/2008 | Gholmieh et al. | |
| 2008/0260062 A1 | 10/2008 | Imamura | |
| 2008/0268878 A1 | 10/2008 | Wang et al. | |
| 2009/0042616 A1 | 2/2009 | Teo et al. | |
| 2009/0156225 A1* | 6/2009 | Angelow et al. | 455/450 |
| 2009/0168683 A1* | 7/2009 | Franceschini et al. | 370/312 |
| 2009/0247201 A1* | 10/2009 | Ye et al. | 455/509 |
| 2010/0046412 A1 | 2/2010 | Varadarajan et al. | |
| 2010/0061345 A1* | 3/2010 | Wengerter et al. | 370/335 |
| 2010/0080152 A1* | 4/2010 | Lindh et al. | 370/280 |
| 2010/0097978 A1* | 4/2010 | Palanki et al. | 370/315 |
| 2010/0167726 A1* | 7/2010 | Schwalb | 455/433 |
| 2010/0195583 A1* | 8/2010 | Nory et al. | 370/329 |
| 2010/0208660 A1* | 8/2010 | Ji | 370/328 |
| 2010/0232346 A1* | 9/2010 | Yu et al. | 370/315 |
| 2010/0273506 A1 | 10/2010 | Stern-Berkowitz et al. | |
| 2010/0279634 A1* | 11/2010 | Sagfors et al. | 455/127.1 |
| 2010/0322154 A1 | 12/2010 | Chen et al. | |
| 2011/0013554 A1* | 1/2011 | Koskinen | 370/315 |
| 2011/0064159 A1 | 3/2011 | Ko et al. | |
| 2011/0243090 A1 | 10/2011 | Grovlen et al. | |
| 2011/0261751 A1* | 10/2011 | Ode et al. | 370/315 |
| 2011/0275363 A1 | 11/2011 | Kwon et al. | |
| 2011/0317641 A1 | 12/2011 | Noh et al. | |
| 2012/0020323 A1 | 1/2012 | Noh et al. | |
| 2012/0044851 A1 | 2/2012 | Wang et al. | |
| 2012/0093051 A1 | 4/2012 | Xu | |
| 2012/0155338 A1 | 6/2012 | Noh et al. | |
| 2012/0163335 A1 | 6/2012 | Chung et al. | |

FOREIGN PATENT DOCUMENTS

| | | |
|---|---|---|
| RU | 2316059 C2 | 1/2008 |
| WO | 2004097797 A1 | 11/2004 |
| WO | 2005091593 | 9/2005 |
| WO | WO2006105005 | 10/2006 |
| WO | 2008135851 A1 | 11/2008 |

OTHER PUBLICATIONS

Fujitsu: "DL eNodeB sub-frame for DL backhaul" 3GPP Draft; R1-091965, 3rd Generation Partnership Project (3GPP), Mobile Competence Centre ; 650, Route Des Lucioles ; F-06921 Sophia-Antipolis Cedex ; France, no. San Francisco-, USA; 20090428, Apr. 28, 2009. (2 pages).

International Search Report and Written Opinion—PCT/US2010/036741, International Search Authority—European Patent Office—Sep. 23, 2010.

International Search Report and Written Opinion—PCT/US2010/039252, International Search Authority—European Patent Office—Oct. 12, 2010.

LG Electronics: "Downlink Reference Signal for Higher Order MIMO" 3GPP Draft; R1-090218_LGE_DL_-RS, 3rd Generation Partnership Project (3GPP).

Mobile Competence Centre ; 650, Route Des Lucioles ; F-06921 Sophia-Antipolis Cedex ; France, no. Ljubljana; 20090108, Jan. 8, 2009, XP050318148 [retrieved on Jan. 8, 2009] p. 3, line 28-line 33.

LG Electronics: "Issues on DL-RS Design for LTE-A" 3GPP Draft; R1-090787, 3rd Generation Partnership Project (3GPP), Mobile Competence Centre ; 650, Route Des Lucioles ; F-06921 Sophia-Antipolis Cedex ; France, no. Athens, Greece; 20090203, Feb. 3, 2009, XP050318644 [retrieved on Feb. 3, 2009] p. 1, line 7-line 9 p. 2, line 5-line 19 p. 3, line 6-line 16 p. 3, line 29-line 36.

3GPP TS 36.211 version 8.7.0 Release 8 , LTE; Evolved Universal Terrestrial Radio Access (E-UTRA); Physical channels and modulation Technical Specification, European Telecommunications Standards Institute (ETSI), 650, Route Des Lucioles ; F-06921 Sophia-Antipolis ; France, No. V8.7.0, Jun. 1, 2009, XP014044748.

Nokia Siemens Networks et al: "Control Channel for Relay Backhaul link" 3GPP Draft; R1-091763_Control Relays Backhaul, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339287 [retrieved on Apr. 28, 2009] p. 1, line 4-1ine 7 p. 1, line 9-line 30 p. 2, line 4-line 12 main figure; p. 2 p. 3, line 24-line 29.

Qualcomm Europe: "Extension Carriers for LTE-A" 3GPP Draft; RI-094203 Extension Carriers for LTE-A, 3rd Generation Partnership Project (3GPP), Mobile Competence Centre ; 650, Route Des Lucioles ; F-06921 Sophia-Antipolis Cedex ; France, no. Miyazaki; 20091012, Oct. 12, 2009, XP050388673 [retrieved on Oct. 6, 2009] the whole document.

Qualcomm Europe: "Notions of segment and non-backward compatible carriers for LTE-A" 3GPP Draft; RI-093119 MC Notions, 3rd Generation Partnership Project (3GPP), Mobile Competence Centre ; 650, Route Des Lucioles ; F-06921 Sophia-Antipolis Cedex ; France, no. Shenzhen, China; 20090819, Aug. 19, 2009, XP050351490 [retrieved on Aug. 19, 2009] the whole document.

Texas Instruments: "Refinement on, Downlink Reference Signal Design" , 3GPP Draft; RI-091291 TI DLRS, 3rd , Generation Partnership Project (3GPP).

Mobile Competence Centre ; 650, Route Des Lucioles ; F-06921 Sophia-Antipolis Cedex ; France, no. Seoul, Korea; 20090318, Mar. 18, 2009, XP050338898 [retrieved on Mar. 18, 2009] section 1 section 2 section 5 figures 1,2 p. 3, line 29-line 35 appendix; p. 6.

ZTE: "General control channel design for LTE-A" 3GPP Draft; RI-083609 General Control Channel Design for LTE-A, 3rd Generation Partnership Project (3GPP), Mobile Competence Centre ; 650, Route Des Lucioles ; F-06921 Sophia-Antipolis Cedex ; France, no. Prague, Czech Republic; 20080924, Sep. 24, 2008, XP050316969 [retrieved on Sep. 24, 2008] p. 1, line 4-line 9 p. 1; figure 2.1.

3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre ; 650, Route Des Lucioles ; F-06921 Sophia-Antipolis Cedex ; France, No. V8.6.0, Mar. 1, 2009, pp. 1-83, XP050377538.

Ericsson: "Efficient support of relays through MBSFN subframes" 3GPP Draft; R1-084357, 3rd Generation Partnership Project (3GPP), Mobile Competence Centre ; 650, Route Des Lucioles ; F-06921 Sophia-Antipolis Cedex ; France, no. Prague, Czech Republic; 20081104, Nov. 4, 2008, XP050317627 [retrieved on Nov. 4, 2008].

Fujitsu: "Subframe configuration for supporting high order DL MIMO", 3GPP TSG-RAN1 #56Bis, R1-091507, Mar. 27, 2009.

Qualcomm Europe: "Support of Rel-8 UEs by LTE-A Relays", 3GPP RAN WG1#54bis, R1-084054, Oct. 3, 2008.

3GPP: "LTE; Evolved Universal Terrestrial Radio Access (E-UTRA; User Equipment (UE) procedures in idle mode (3GPP TS 36.304 version 8.5.0 Release 8)" ETSI TS 136 304 V8.5.0, Apr. 30, 2009, pp. 31.

Taiwan Search Report—TW099117263—TIPO—Jun. 2, 2013.

* cited by examiner

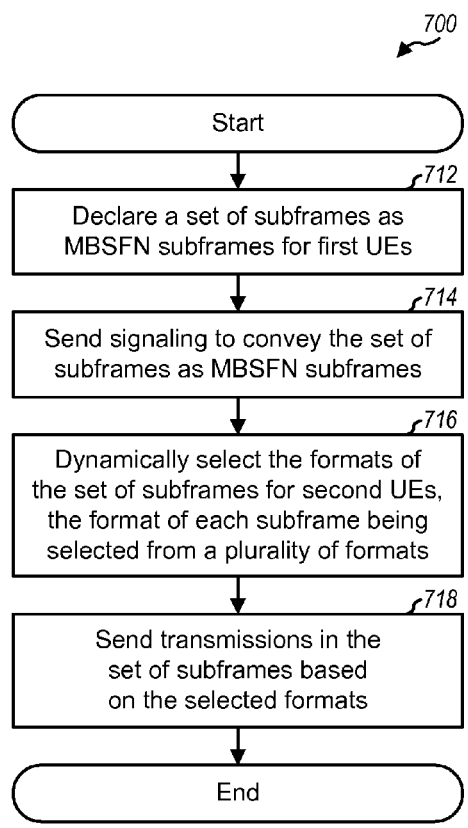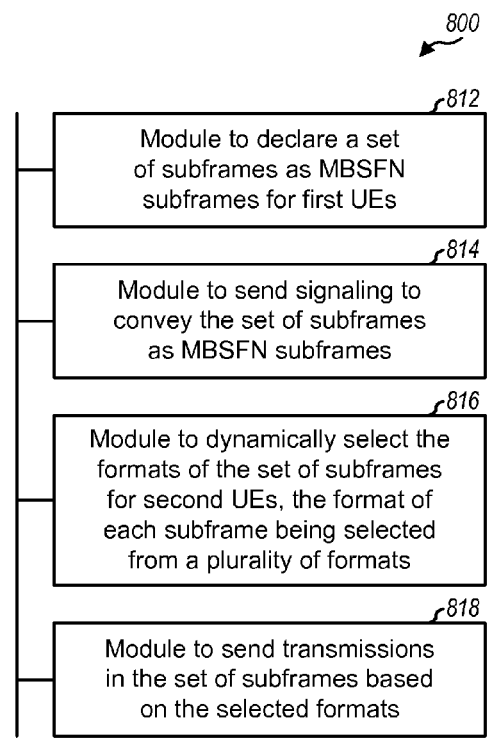
FIG. 7
FIG. 8

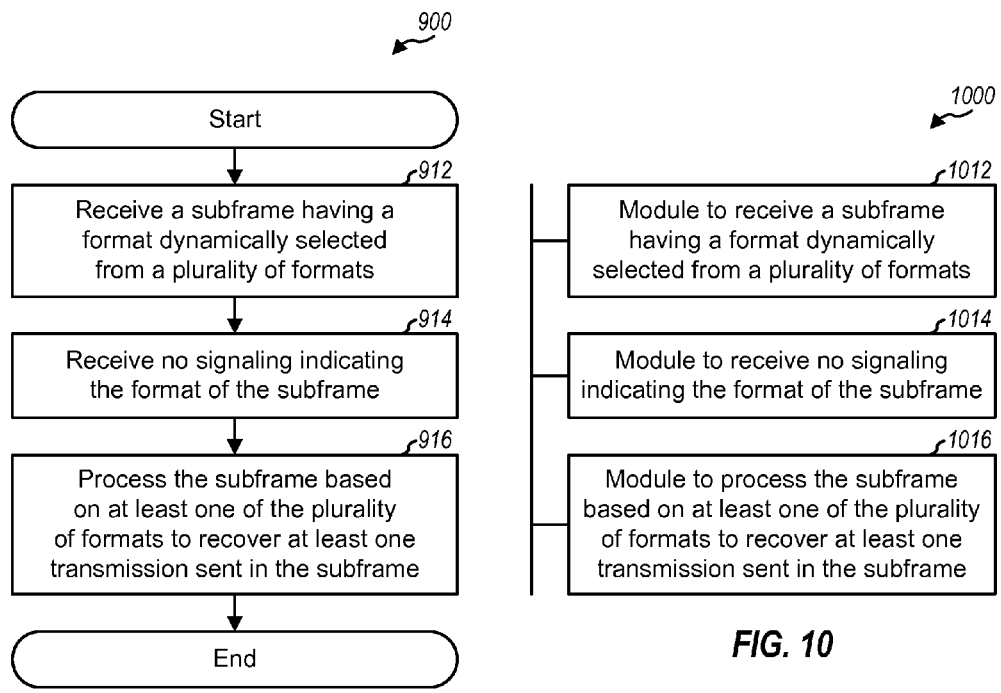

DYNAMIC SELECTION OF SUBFRAME FORMATS IN A WIRELESS NETWORK

The present application claims priority to provisional U.S. Application Ser. No. 61/182,007, entitled "Method and Apparatus to Enable Dynamic Selection Between Normal and Special Subframes," filed May 28, 2009, assigned to the assignee hereof and incorporated herein by reference.

BACKGROUND

I. Field

The present disclosure relates generally to communication, and more specifically to techniques for supporting communication in a wireless network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The base station may support communication for UEs of different types. Each type of UEs may have certain capabilities and may expect certain transmissions from the base station. It may be desirable to support communication for the UEs of different types in an efficient manner.

SUMMARY

Techniques for dynamically selecting subframe formats in a wireless network are described herein. In an aspect, a base station may dynamically switch between different subframe formats (or different types of subframes) to more efficiently support communication for different types of UEs. Each subframe format may be associated with certain channels and/or signals to be sent in certain manner.

In one design, a base station may declare a set of subframes as multicast/broadcast single frequency network (MBSFN) subframes for first/legacy UEs. The base station may send signaling to convey the set of subframes as MBSFN subframes to the legacy UEs. The base station may dynamically select the formats of the set of subframes for second/new UEs, e.g., on a per subframe basis. The format of each subframe may be selected from a plurality of formats. The different types of UEs and the different subframe formats are described in detail below. The base station may send transmissions in the set of subframes based on the selected formats. The base station may also send a cell-specific reference signal (CRS) in each subframe in the set of subframes based on an MBSFN subframe format in order to support the legacy UEs.

In one design, the plurality of formats may include at least one regular subframe format, at least one MBSFN subframe format, and/or at least one new subframe format. The base station may select an MBSFN subframe format, or a regular subframe format, or a new subframe format for each subframe in the set of subframes. In another design, the plurality of formats may include at least one MBSFN subframe format and at least one blank subframe format. The base station may select an MBSFN subframe format or a blank subframe format for each subframe in the set of subframes, e.g., based on the number of legacy UEs and/or the level of activity of the legacy UEs.

In yet another design, the set of subframes may be designated as regular subframes for the legacy UEs but may be configured as MBSFN subframes, blank subframes, and/or new subframes for the new UEs. The base station may reconfigure a subframe in the set of subframes as a regular subframe when needed, e.g., to send a page to a legacy UE.

In one design, a new UE may receive a subframe having a format that may be dynamically selected from the plurality of formats. The new UE may process the subframe based on at least one of the plurality of formats to recover at least one transmission sent in the subframe. For example, the new UE may process the subframe based on one format at a time and may terminate processing of the subframe when the at least one transmission is recovered from the subframe.

Various aspects and features of the disclosure are described in further detail below.

BRIEF DESCRIPTION OF THE DRAWINGS

FIGS. 7 and 8 show a process and an apparatus, respectively, for sending transmissions with dynamic subframe selection.

FIGS. 9 and 10 show a process and an apparatus, respectively, for receiving transmissions sent with dynamic subframe selection.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP).

cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
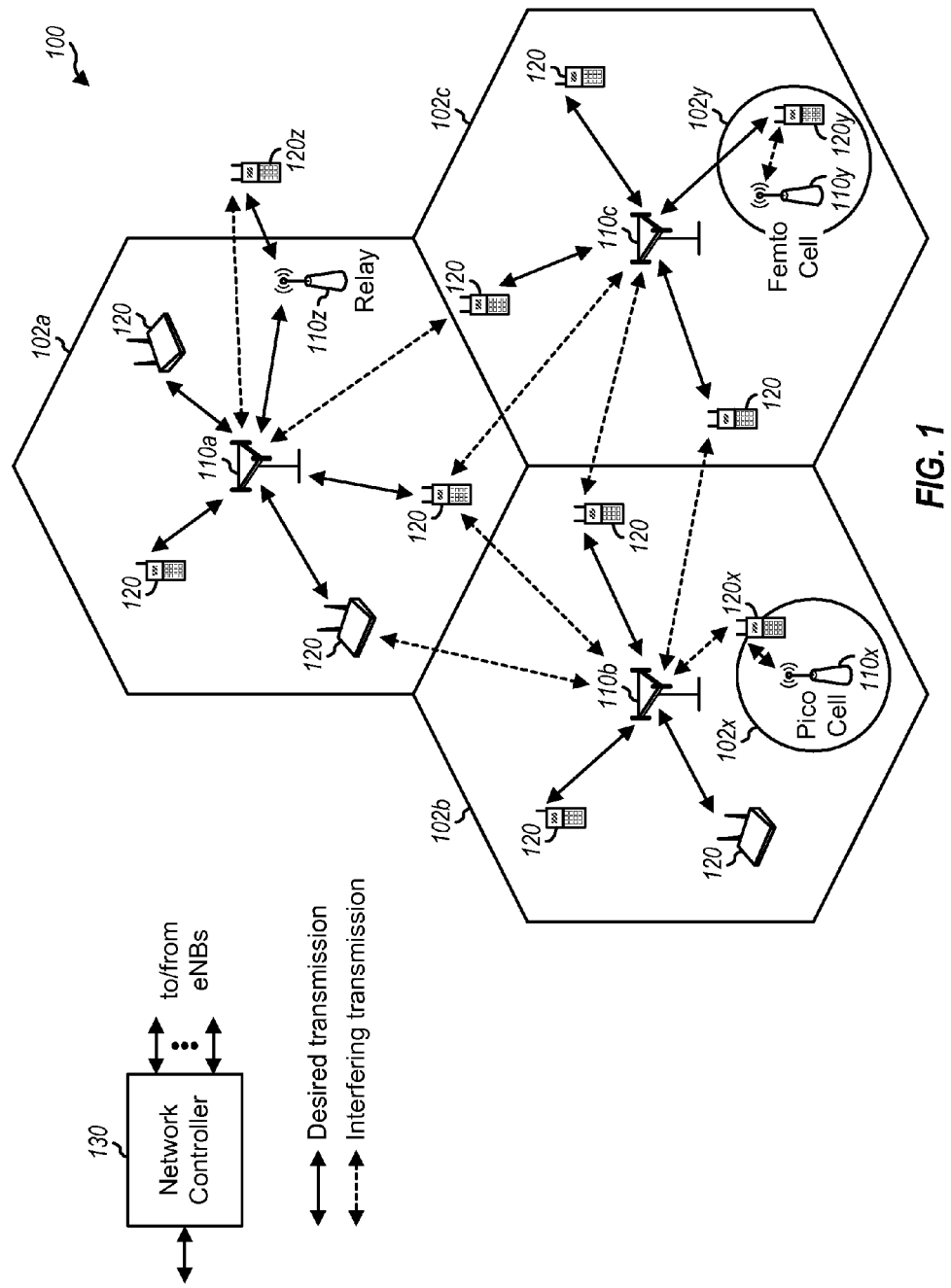
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area. An eNB may provide communication coverage for a macro cell, a pico cell, a femto cell, and/or other types of cell. In the example shown in FIG. 1, eNBs 110a, 110b and 110c may be macro eNBs for macro cells 102a, 102b and 102c, respectively. eNB 110x may be a pico eNB for a pico cell 102x. eNB 110y may be a femto eNB for a femto cell 102y. The terms "eNB" and "base station" may be used interchangeably herein.

Wireless network 100 may also include relay stations. A relay station is an entity that receives a transmission of data from an upstream station (e.g., an eNB or a UE) and sends a transmission of the data to a downstream station (e.g., a UE or an eNB). A relay station may also be a UE that relays transmissions for other UEs. In the example shown in FIG. 1, a relay station 110z may communicate with macro eNB 110a and a UE 120z in order to facilitate communication between eNB 110a and UE 120z. A relay station may also be referred to as a relay eNB, a relay base station, a relay, etc.

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time intervals.

Figure 2:
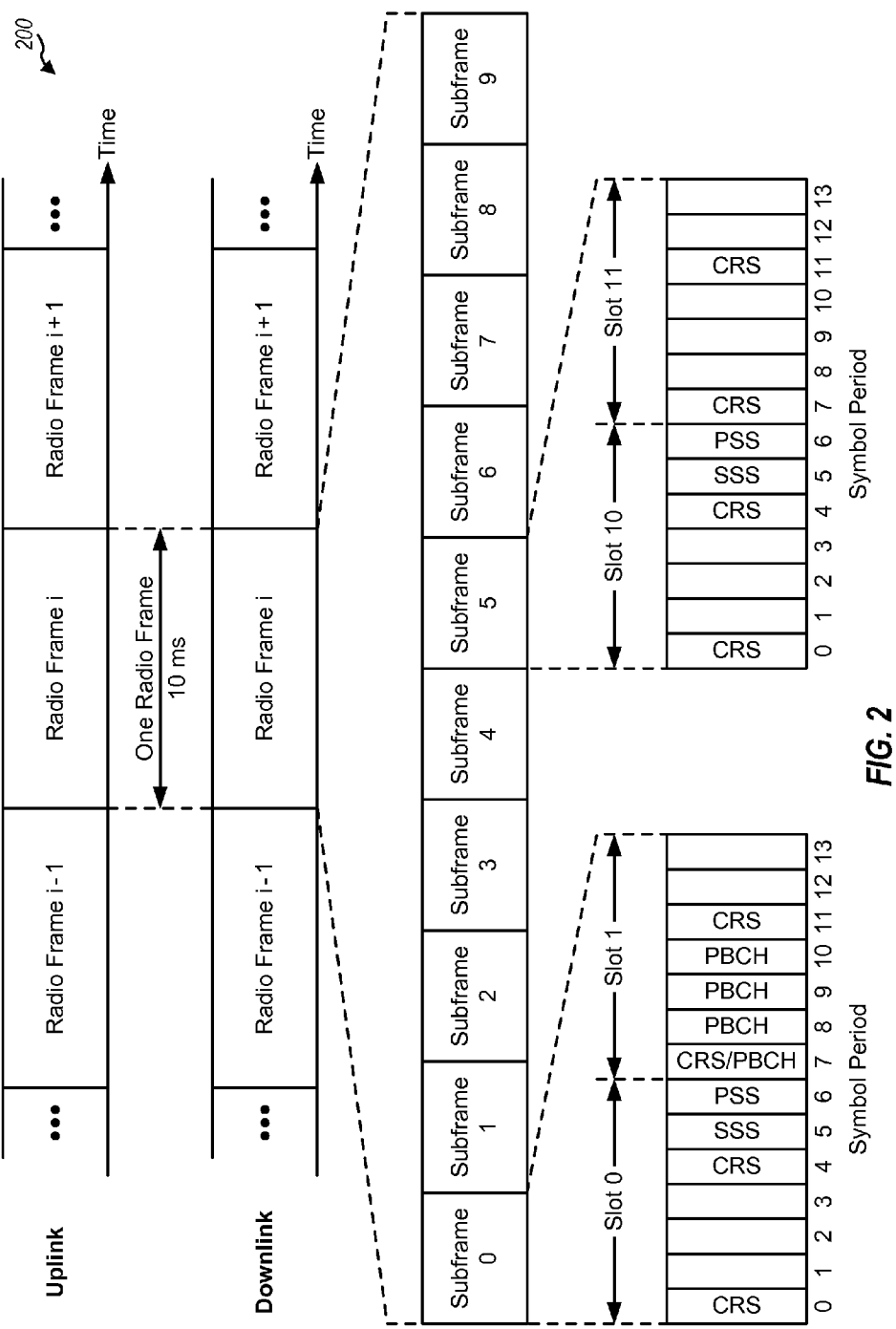
FIG. 2 shows a frame structure for frequency division duplexing (FDD).

FIG. 2 shows a frame structure 200 used for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1. On the downlink, an OFDM symbol may be transmitted in each symbol period of a subframe. On the uplink, an SC-FDMA symbol may be transmitted in each symbol period of a subframe.

On the downlink in LTE, an eNB may transmit a primary synchronization signal (PSS) and a secondary synchronization signal (SSS) in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 2. The PSS and SSS may be used by the UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information.

Figure 3:
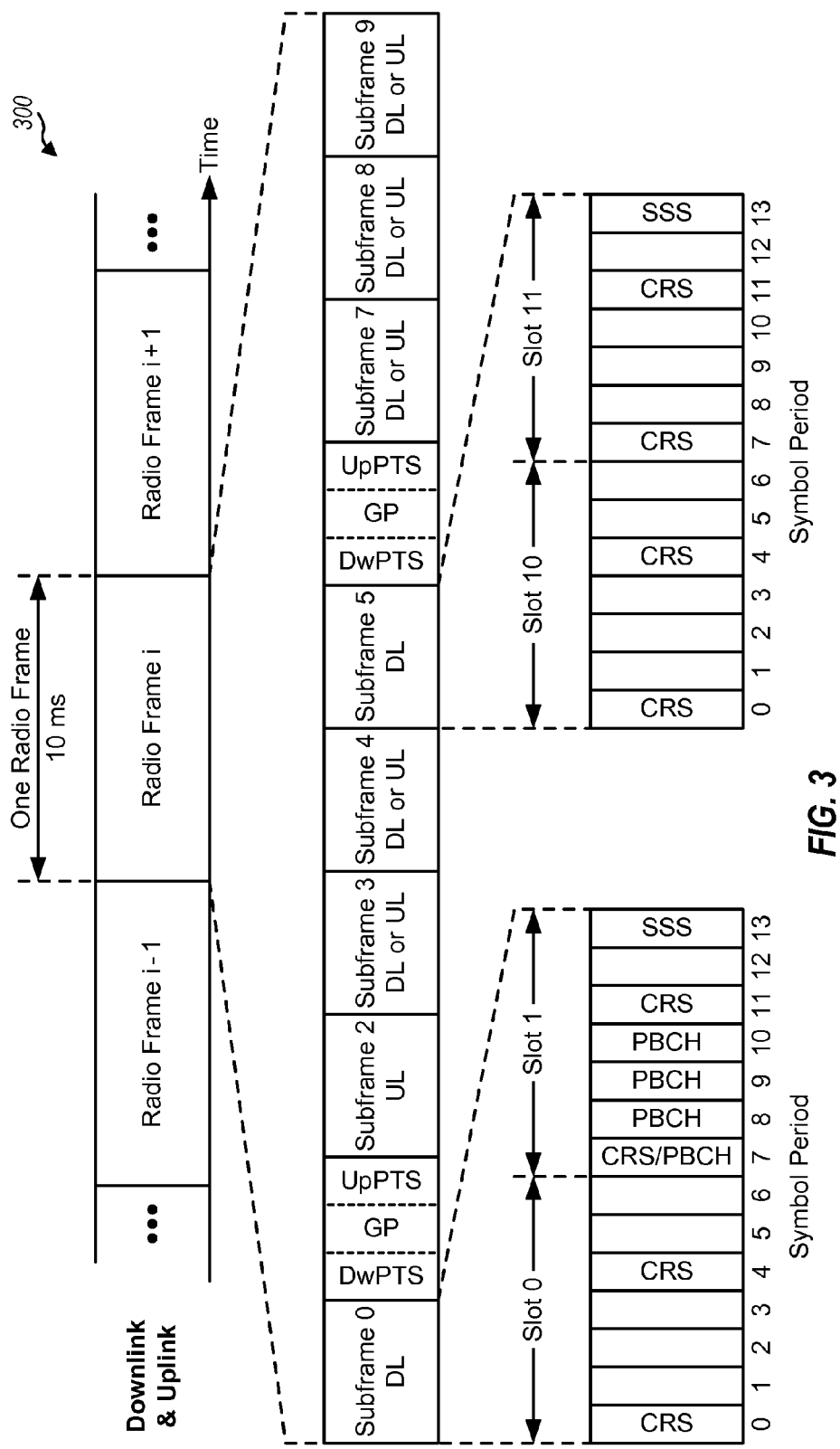
FIG. 3 shows a frame structure for time division duplexing (TDD).

FIG. 3 shows a frame structure 300 used for TDD in LTE. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of a Downlink Pilot Time Slot (DwPTS) used for downlink control channels as well as data transmissions, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations.

On the downlink, an eNB may transmit the PSS in symbol period 2 of subframes 1 and 6 (not shown in FIG. 3), and the SSS in the last symbol period of subframes 0 and 5. The eNB may transmit the CRS in certain symbol periods of each downlink subframe. The eNB may also transmit the PBCH in subframe 0 of certain radio frames.

The various signals and channels in LTE are described in 3GPP TS 36.211, entitled "Evolved Universal Terrestrial Radio Access (E-UTRA); Physical Channels and Modulation," which is publicly available. Frame structures 200 and 300 are also described in 3GPP TS 36.211.

LTE supports several subframe formats for the downlink. A subframe format may also be referred to as a subframe type, and the terms "type" and "format" may be used interchangeably. Each subframe format may be associated with certain characteristics, e.g., certain signals and channels being sent in a subframe of that format and/or a specific way in which a signal or channel is sent in the subframe. Subframes of different formats may be used for different purposes.

Figure 4:
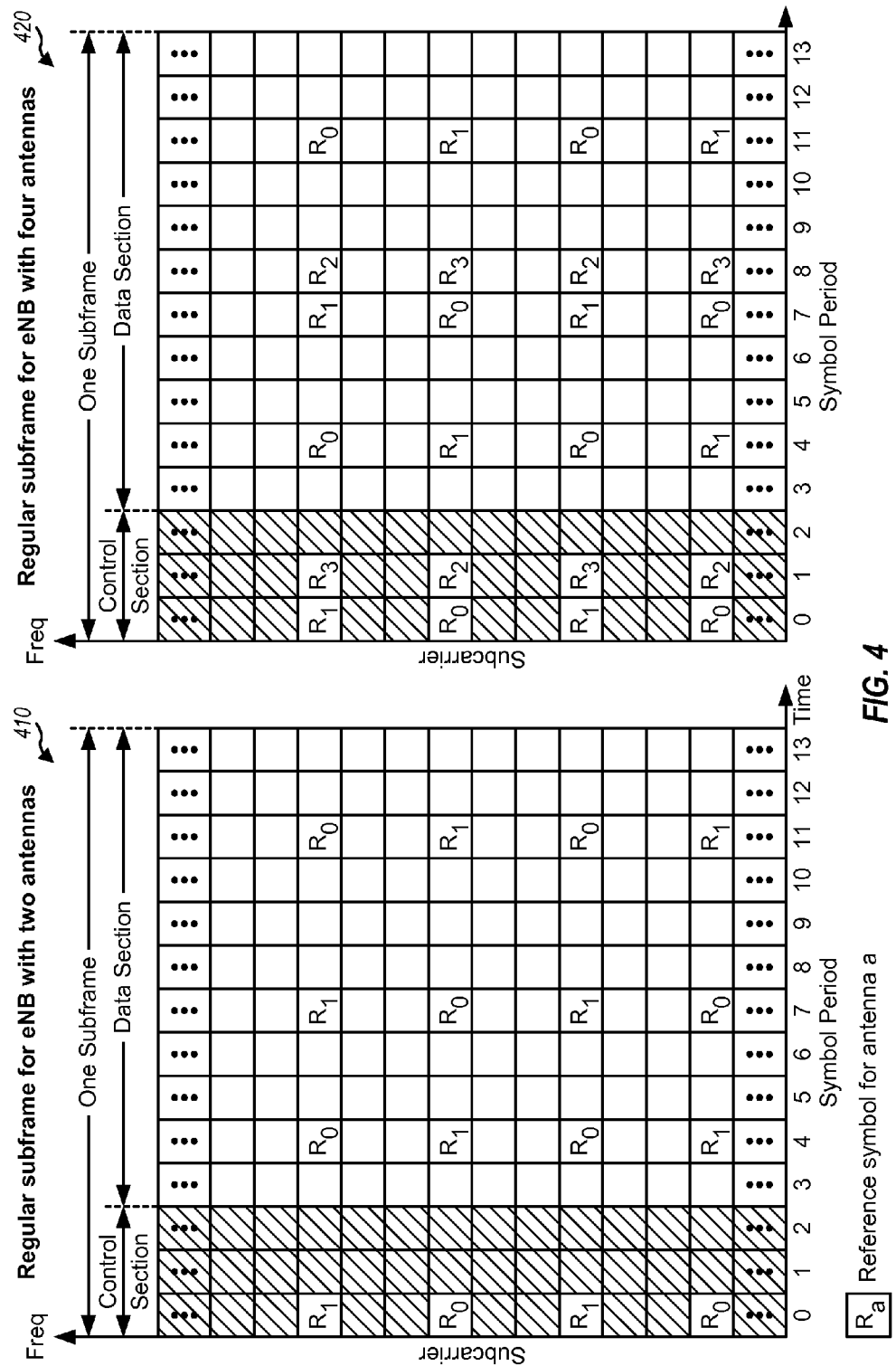
FIG. 4 shows two regular subframe formats.

FIG. 4 shows two regular subframe formats 410 and 420 that may be used for the downlink in LTE. Regular subframe formats 410 and 420 are defined in LTE Releases 8 and 9. For the normal cyclic prefix in LTE, the left slot includes seven symbol periods 0 through 6, and the right slot includes seven symbol periods 7 through 13. Each slot may include a number of resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used by an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8.

For both subframe formats 410 and 420, a subframe may include a control section followed by a data section. The control section may include the first Q symbol periods of the subframe, where Q may be equal to 1, 2, 3 or 4. Q may change from subframe to subframe and may be conveyed in the first symbol period of the subframe. The control section may carry control information. The data section may include the remaining 2L−Q symbol periods of the subframe and may carry data and/or other information for UEs.

Figure 5:
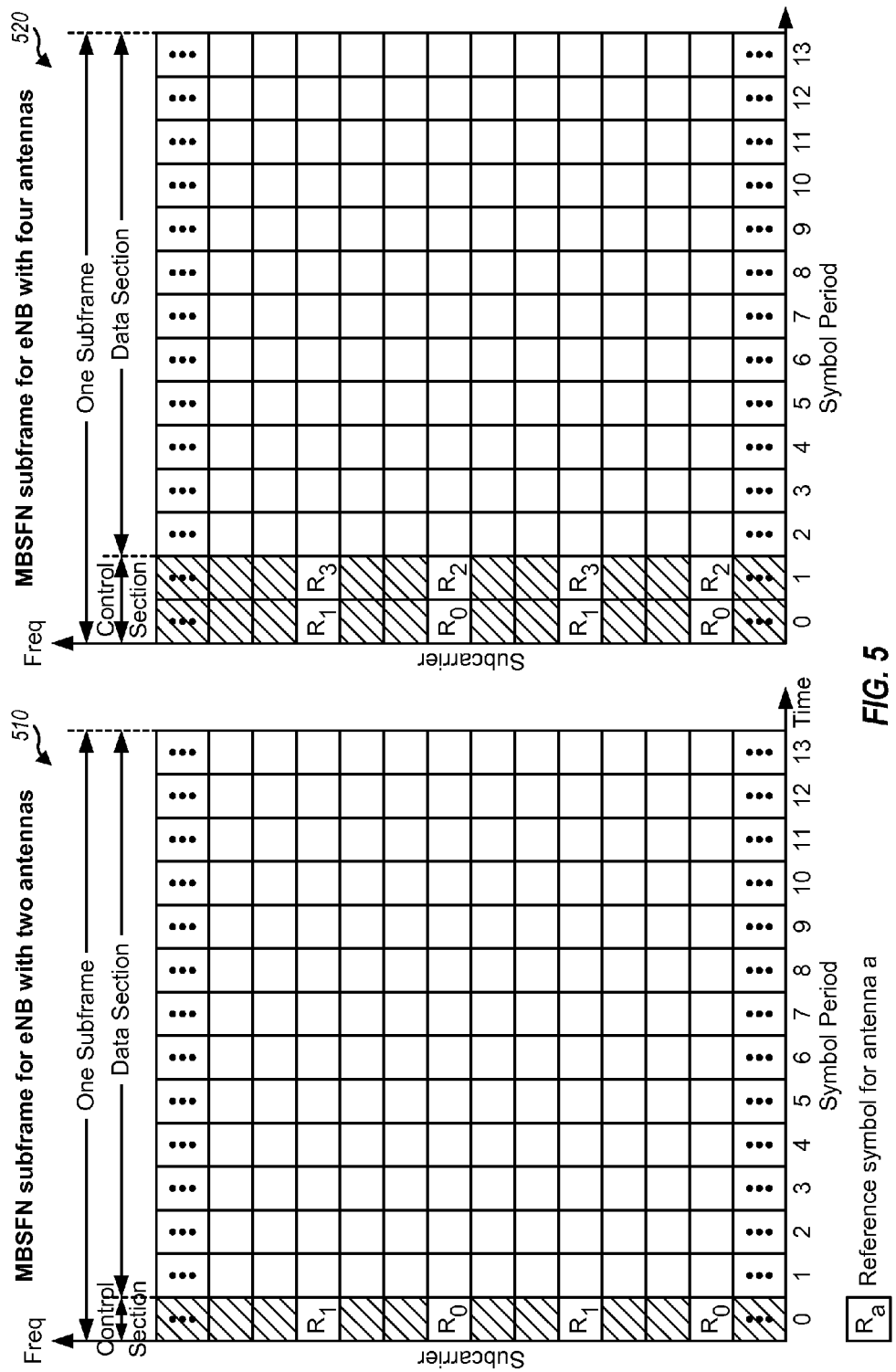
FIG. 5 shows two MBSFN subframe formats.

FIG. 5 shows two MBSFN subframe formats 510 and 520 that may be used for the downlink in LTE. MBSFN subframe formats 510 and 520 are defined in LTE Releases 8 and 9. Subframe format 510 may be used by an eNB equipped with two antennas. A CRS may be transmitted from antennas 0 and 1 in symbol period 0. In the example shown in FIG. 5, Q=1 and the control section covers one symbol period. Subframe format 520 may be used by an eNB equipped with four antennas. A CRS may be transmitted from antennas 0 and 1 in symbol period 0 and from antennas 2 and 3 in symbol period 1. In the example shown in FIG. 5, Q=2 and the control section covers two symbol periods.

An eNB may transmit a Physical Control Format Indicator Channel (PCFICH), a Physical Hybrid ARQ Indicator Channel (PHICH), and a Physical Downlink Control Channel (PDCCH) in the control section of a subframe. The PCFICH may be transmitted in the first symbol period of the subframe and may convey the size of the control region (i.e., the value of Q). The PHICH may carry acknowledgement (ACK) and negative acknowledgement (NACK) information for data transmission sent by UEs on the uplink with hybrid automatic repeat request (HARQ). The PDCCH may carry downlink control information for UEs. The eNB may also transmit a Physical Downlink Shared Channel (PDSCH) in the data section of a subframe. The PDSCH may carry unicast data for individual UEs, multicast data for groups of UEs, and/or broadcast data for all UEs.

Wireless network 100 may also support subframes of other formats, such as blank subframes and new subframes. A blank subframe may include no transmission (e.g., no CRS) and may be used to reduce interference to UEs in neighbor cells. A new subframe may include other types of CRS and/or other channels that are not sent in a regular subframe or an MBSFN subframe. For example, a new subframe may include a channel quality indicator reference signal (CQI-RS) to support channel quality measurement, a UE reference signal (UE-RS) sent to a specific UE on resource elements normally used for the CRS, a PDSCH transmission sent on resource elements normally used for the CRS, a Relay-PDCCH (R-PDCCH) and/or a Relay-PDSCH (R-PDSCH) to support operation of relay stations, etc. Blank subframes and/or new subframes may be defined in LTE Releases later than LTE Release 9.

Wireless network 100 may support different types of UEs such as "legacy" UEs and "new" UEs. A legacy UE may support LTE Release 8 or 9 or some other release and may have certain interpretation of the regular subframes and MBSFN subframes, e.g., as specified in LTE Release 8 or 9 standard. A new UE may support a later LTE release and may have a different interpretation of the regular subframes and MBSFN subframes as compared to a legacy UE.

An eNB may declare a particular subframe as an MBSFN subframe, e.g., via system information broadcast to all UEs. A legacy UE may expect a CRS and control information in the control section of the MBSFN subframe. The eNB may separately inform the legacy UE (e.g., via upper layer signaling) to expect broadcast data in the data section of the MBSFN subframe. In this case, the legacy UE may expect broadcast data in the data section. Alternatively, the eNB may not inform the legacy UE to expect broadcast data in the data section of the MBSFN subframe. In this case, the legacy UE would not expect broadcast data in the data section and may skip this section.

In an aspect, an eNB may dynamically switch between different subframe formats (or different types of subframes) to more efficiently support communication for both legacy and new UEs. In one design, the eNB may declare some subframes as MBSFN subframes and may reserve some other subframes as regular subframes and/or subframes of other formats. For example, the eNB may declare as many subframes as MBSFN subframes as possible in a semi-static manner. The eNB may send signaling (e.g., system information) to convey the MBSFN subframes to the legacy UEs. However, the eNB may dynamically switch between the MBSFN subframes and other subframes (e.g., regular subframes and/or new subframes) for the new UEs.

In one design, the eNB may dynamically switch between different subframe formats on a subframe-by-subframe basis. For a given subframe declared as an MBSFN subframe, the eNB may select a particular format for the subframe from among a set of supported formats. For example, the eNB may determine whether to transmit a regular subframe, or a new subframe, or an MBSFN subframe, or a subframe of some other format. The eNB may transmit a CRS in (i) the first symbol period of the subframe if it is equipped with two antennas or (ii) the first two symbol periods of the subframe if it is equipped with four antennas. The eNB may or may not transmit control information in the first one or two symbol periods of the subframe. The eNB may send any suitable transmissions in the remaining symbol periods of the subframe to the new UEs, as supported by the selected format of the subframe. These transmissions may be ignored by the legacy UEs.

In one design, for the subframes declared as MBSFN subframes, the eNB may dynamically switch between different subframe formats without informing the new UEs. In this design, the new UEs may process each subframe declared as an MBSFN subframe under different hypotheses for different formats that can be used for that subframe. In another design, the eNB may send signaling to inform the new UEs of the selected formats for the subframes declared as MBSFN subframes. In this design, the new UEs may process each subframe declared as an MBSFN subframe based on the format selected for that subframe.

A legacy UE may receive the system information from the eNB and can ascertain which subframes are declared as MBSFN subframes. For a given subframe declared as an MBSFN subframe, the legacy UE may expect certain transmissions such as the CRS in the first one or two symbol periods of the subframe. The legacy UE may perform channel estimation based on the CRS received in the subframe. The legacy UE may skip the remaining symbol periods of the subframe or may process the control section of the subframe to recover control information for uplink grant, ACK/NACK, etc.

A new UE may also receive the system information from the eNB and can ascertain which subframes are declared as MBSFN subframes. For the design in which signaling is not sent to convey the selected formats of the subframes declared as MBSFN subframes, the new UE may expect a given subframe declared as an MBSFN subframe to be a regular subframe, or an MBSFN subframe, or a new subframe, or a subframe of some other format. The new UE may then process the subframe for different possible hypotheses. For example, the new UE may first process the subframe under a hypothesis that it is a regular subframe and may perform demodulation and decoding for control information normally sent in a regular subframe. If such control information is not decoded correctly, then the new UE may next process the subframe under a hypothesis that it is a new subframe and may perform demodulation and decoding for control information normally sent in a new subframe. If such control information is not decoded correctly, then the new UE may next process the subframe under a hypothesis that it is an MBSFN subframe. The UE processing may be simplified in some cases. For example, the new UE may demodulate the control information sent in the control section of the subframe. If the new UE receives a downlink grant in the control section, then the new UE may assume that the subframe is a regular subframe. Otherwise, the new UE may treat the subframe as an MBSFN subframe and may ignore the data section of the subframe.

In general, a new UE may process a subframe declared as an MBSFN subframe for any number of subframe formats. In one design, the new UE may process the subframe for one format at a time and may terminate when certain information normally sent for that format is decoded correctly. In another design, the new UE may process the subframe for different possible formats and may obtain a metric for each format. The new UE may then select the format with the best metric. The new UE may also process the subframe for different possible formats in other manners. In any case, the MBSFN subframes may be originally intended for supporting single frequency network (SFN) broadcast transmissions but may be used as a general forward-compatibility mechanism.

Figure 6:
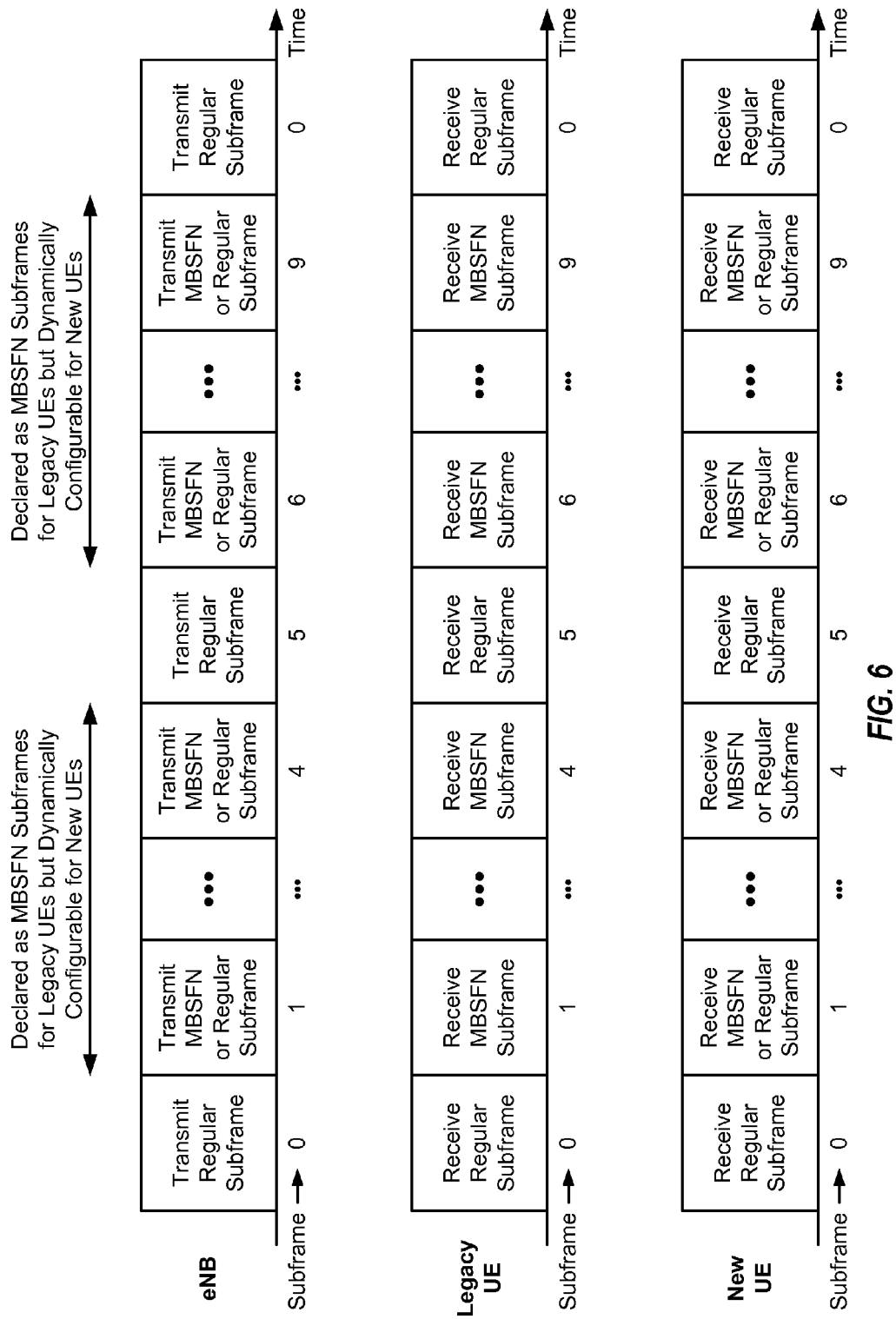
FIG. 6 shows dynamic switching between different subframe formats.

FIG. 6 shows a design of dynamic switching between different subframe formats. In this design, an eNB may declare subframes 1 through 4 and subframes 6 through 9 as MBSFN subframes and may reserve subframes 0 and 5 as regular subframes for the legacy UEs. The eNB may send signaling (e.g., system information) to convey the subframes declared as MBSFN subframes.

A legacy UE may process subframes 0 and 5 as regular subframes. For each regular subframe, the legacy UE may receive the CRS and perform channel estimation. The legacy UE may also demodulate and decode the control section of the subframe to recover any control information sent to the legacy UE. The legacy UE may also demodulate and decode the data section of the subframe, if directed by control information received from the control section. The legacy UE may process subframes 1 through 4 and subframes 6 through 9 as MBSFN subframes. For each subframe declared as an MBSFN subframe, the legacy UE may receive the CRS in the first one or two symbol periods of the subframe and may perform channel estimation. The legacy UE may skip the remaining symbol periods of the subframe.

A new UE may process subframes 0 and 5 as regular subframes. For each regular subframe, the new UE may receive the CRS and perform channel estimation. The new UE may also demodulate and decode the control section of the subframe to recover any control information sent to the new UE and may also demodulate and decode the data section of the subframe if directed by control information received from the control section. The new UE may process subframes 1 through 4 and subframes 6 through 9 as regular subframes, or new subframes, or MBSFN subframes, and/or subframes of other types. The new UE may process each subframe declared as an MBSFN subframe as described above.

In one design, an eNB may dynamically switch between MBSFN subframes (which may be signaled to the legacy UEs) and blank subframes (which may have a format that is unknown to the legacy UEs). The eNB may switch to a blank subframe in order to reduce interference to UEs in neighbor cells.

In one design, the eNB may switch between MBSFN subframes and blank subframes based on the level of activity of the legacy UEs. For example, the eNB may switch from MBSFN subframes to blank subframes for all subframes, except for subframes 0 and 5, if there are few legacy UEs in a cell. The number of legacy UEs in the cell may be determined, for example, based on paging activity of the legacy UEs. Subframes 0 or 5 may be configured as regular subframes so that measurement accuracy of the legacy UEs will not degrade excessively. In general, the number of MBSFN subframes to switch to blank subframes may be dependent on (e.g., may be inversely proportional to) the number of legacy UEs and/or the level of activity of the legacy UEs. In another design, the eNB may configure some subframes as MBSFN subframes (e.g., so that the CRS in these subframes is available for channel measurements) and other subframes as blank subframes.

The eNB may send no transmissions in a blank subframe. The legacy UEs may expect the CRS in the first one or two symbol periods of the subframe and may perform channel estimation based on the expected CRS. Since the CRS is not transmitted in the blank subframe, the legacy UEs may observe degradation in channel estimation performance. This degradation may be mitigated by placing the legacy UEs in a discontinuous reception (DRX) mode prior to a blank subframe.

In LTE Release 8, at most six out of a total of ten subframes in a radio frame may be designated as MBSFN subframes. Subframes 0, 4, 5 and 9 in FDD and subframes 0, 1, 5 and 6 in TDD may be reserved subframes that cannot be designated as MBSFN subframes in LTE Release 8. The reserved subframes may be considered as regular subframes by the legacy UEs and may be used by these UEs for measurement and/or other purposes. Furthermore, pages may be sent to the legacy UEs only in the reserved subframes.

In one design, an eNB may configure one or more reserved subframes (e.g., subframe 0, 4, 5 and/or 9 in FDD, or subframe 0, 1, 5 and/or 6 in TDD) as MBSFN subframes, blank subframes, and/or new subframes for the new UEs. This may allow the eNB to maximize use of new features and allocate more bandwidth to the new features for the new UEs.

The legacy UEs may consider all reserved subframes to be regular subframes based on LTE Release 8. Thus, there may be some adverse impact to the legacy UEs if the eNB configures one or more reserved subframes as MBSFN subframes, blank subframes, and/or new subframes. One adverse impact may be degraded measurement accuracy, which may be deemed to be an acceptable tradeoff. In one design, to minimize measurement impacts, the legacy UEs may be placed in a DRX mode prior to a reserved subframe that has been configured as an MBSFN subframe, a blank subframe, or a new subframe. The legacy UEs may skip this reserved subframe due to DRX operation. Another adverse impact may be missed pages for the legacy UEs. This impact may be addressed as described below.

In one design, the eNB may reconfigure a reserved subframe, which has been configured as an MBSFN subframe, a blank subframe, or a new subframe for the new UEs, back to a regular subframe. For example, if a legacy UE receives a page in such a reserved subframe, then the eNB may dynamically reconfigure this subframe as a regular subframe and may send the page to the legacy UE in this subframe. This reconfiguration may ensure that no pages are missed by the legacy UEs. The reconfiguration may be from the perspective of the new UEs since the legacy UEs may always consider all reserved subframes to be regular subframes. In one design, the new UEs may be aware that the eNB may dynamically reconfigure some reserved subframes, which had been configured as MBSFN, blank, and/or new subframes, back to regular subframes. In this design, the new UEs may not suffer degradation due to reconfiguration by the eNB.

In one design, MBSFN subframes and/or blank subframes may be used to reduce interference to UEs in other cells. The UEs in the other cells may observe some interference due to dynamic reconfiguration from MBSFN subframes and/or blank subframes back to regular subframes. However, this interference may be an acceptable tradeoff in order to reduce missed pages for the legacy UEs.

A limited number of regular subframes may be available to the legacy UEs due to (i) an eNB declaring as many subframes as possible as MBSFN subframes for the legacy UEs and/or (ii) the eNB configuring some reserved subframes for the legacy UEs as MBSFN subframes, blank subframes, and/or new subframes for the new UEs. In one design, the eNB may give the legacy UEs higher priority for scheduling of data transmission in the regular subframes. This may ensure that as many MBSFN subframes as possible can be used to schedule the new UEs, e.g., using new subframe formats with potentially new features, signals, and/or channels.

FIG. 7 shows a design of a process 700 for sending transmissions with dynamic subframe selection. Process 700 may be performed by a base station/eNB (as described below) or by some other entity. The base station may declare a set of subframes as MBSFN subframes for first/legacy UEs (block 712). This set may include one or more subframes. The base station may send signaling (e.g., system information) to convey the set of subframes as MBSFN subframes (block 714). The base station may dynamically select the formats of the set of subframes for second/new UEs, with the format of each subframe being selected from a plurality of formats (block 716). The base station may send no signaling to convey the selected formats to the second UEs. The base station may send transmissions in the set of subframes based on the selected formats (block 718). The base station may also send a CRS in each subframe in the set of subframes based on an MBSFN subframe format for the first UEs.

In one design, the base station may select the formats of the set of subframes on a per subframe basis. The base station may also select the formats of the set of subframes in other manners, e.g., for each group of one or more subframes.

In one design, the plurality of formats may comprise at least one regular subframe format, or at least one MBSFN subframe format, or at least one new subframe format, or some other subframe format, or a combination thereof. A regular subframe may be defined by a particular standard release (e.g., LTE Release 8) and may carry certain transmissions (e.g., a CRS) for UEs supporting this standard release. An MBSFN subframe may carry certain transmissions (e.g., a CRS) in a first part of the subframe and may carry no transmission in the remaining part of the subframe. An MBSFN subframe may include less CRS than a regular subframe. A new subframe may be defined by a later standard release (e.g., a later LTE Release) and may carry certain transmissions not sent in a regular subframe. The base station may select an MBSFN subframe format, or a regular subframe format, or a new subframe format, or some other format for each subframe in the set of subframes. The at least one regular subframe format may include (i) a first regular subframe format (e.g., subframe format 410 in FIG. 4) having a CRS sent in four symbol periods of a subframe and/or (ii) a second regular subframe format (e.g., subframe format 420) having a CRS sent in six symbol periods of a subframe. The at least one MBSFN subframe format may include (i) a first MBSFN subframe format (e.g., subframe format 510 in FIG. 5) having a CRS sent in one symbol period of a subframe and/or (ii) a second MBSFN subframe format (e.g., subframe format 520) having a CRS sent in two symbol periods of a subframe.

In another design, the plurality of formats may comprise at least one MBSFN subframe format and at least one blank subframe format. A blank subframe may carry no transmissions. The base station may select an MBSFN subframe format or a blank subframe format for each subframe in the set of subframes, e.g., based on the number of UEs expecting to receive an MBSFN subframe, or the level of activity of the UEs, and/or some other criteria.

In yet another design, the set of subframes may be designated as regular subframes for the first UEs but may be configured as MBSFN subframes, or blank subframes, or new subframes, or a combination thereof for the second UEs. The set of subframes may include (i) at least one of subframes 0, 4, 5 and 9 for FDD in LTE or (ii) at least one of subframes 0, 1, 5 and 6 for TDD in LTE. The base station may reconfigure a subframe in the set of subframes as a regular subframe when needed. For example, the base station may receive a page for a first UE, reconfigure a subframe in the set of subframes as a regular subframe in response to receiving the page, and send the page in the subframe to the first UE. The base station may place one or more first UEs in a DRX mode prior to each subframe in the set of subframes in order to mitigate channel estimation degradation.

FIG. 8 shows a design of an apparatus 800 for sending transmissions in a wireless network. Apparatus 800 includes a module 812 to declare a set of subframes as MBSFN subframes for first UEs, a module 814 to send signaling to convey the set of subframes as MBSFN subframes, a module 816 to dynamically select the formats of the set of subframes for second UEs, the format of each subframe being selected from a plurality of formats, and a module 818 to send transmissions in the set of subframes based on the selected formats.

FIG. 9 shows a design of a process 900 for receiving transmissions sent with dynamic subframe selection. Process 900 may be performed by a UE (as described below) or by some other entity. The UE may receive a subframe having a format dynamically selected from a plurality of formats (block 912). In one design, the subframe may be declared as an MBSFN subframe for first/legacy UEs and may be dynamically configurable for second/new UEs. The UE may be one of the second UEs. The UE may receive no signaling indicating the format of the subframe (block 914).

The UE may process the subframe based on at least one of the plurality of formats to recover at least one transmission sent in the subframe (block 916). In one design, the UE may process the subframe based on one format at a time and may terminate processing of the subframe when the at least one transmission is recovered from the subframe. The at least one transmission may comprise a signaling message, a data transmission, a reference signal, etc. In another design, the UE may process the subframe based on each format and may select the format that is most likely to have been used, e.g., the format with the best metric. The UE may also process the subframe in other manners.

In one design, the plurality of formats may comprise at least one regular subframe format, or at least one MBSFN subframe format, or at least one blank subframe format, or at least one new subframe format, or a combination thereof. In another design, the subframe may be designated as a regular subframe (e.g., a reserved subframe) for the first UEs and may be configured as an MBSFN subframe, or a blank subframe, or a new subframe for the second UEs. In this design, the subframe may be subframe 0, 4, 5 or 9 for FDD in LTE or subframe 0, 1, 5 or 6 for TDD in LTE.

FIG. 10 shows a design of an apparatus 1000 for receiving transmissions in a wireless network. Apparatus 1000 includes a module 1012 to receive a subframe having a format dynamically selected from a plurality of formats, a module 1014 to receive no signaling indicating the format of the subframe, and a module 1016 to process the subframe based on at least one of the plurality of formats to recover at least one transmission sent in the subframe.

The modules in FIGS. 8 and 10 may comprise processors, electronic devices, hardware devices, electronic components, logical circuits, memories, software codes, firmware codes, etc., or any combination thereof.

Figure 11:
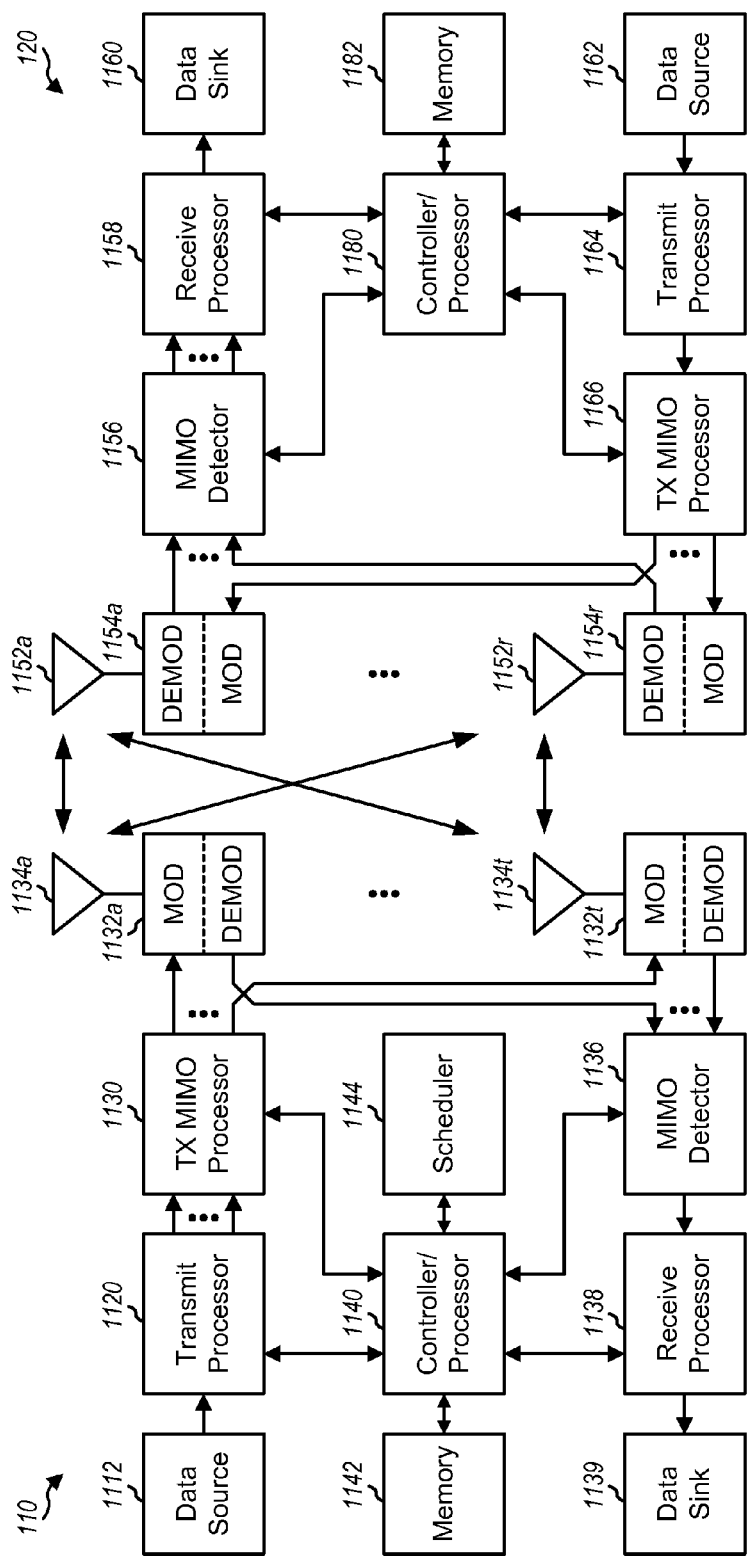
FIG. 11 shows a block diagram of a base station and a UE.

FIG. 11 shows a block diagram of a design of base station/eNB 110 and UE 120, which may be one of the base stations/eNBs and one of the UEs in FIG. 1. Base station 110 may be equipped with T antennas 1134a through 1134t, and UE 120 may be equipped with R antennas 1152a through 1152r, where in general T≥1 and R≥1.

At base station 110, a transmit processor 1120 may receive data from a data source 1112 for one or more UEs, process (e.g., encode and modulate) the data for each UE based on one or more modulation and coding schemes selected for that UE, and provide data symbols for all UEs. Transmit processor 1120 may also process control information (e.g., grants) and overhead information (e.g., system information conveying the MBSFN subframes) and provide control symbols and overhead symbols. Processor 1120 may also generate reference symbols for reference signals (e.g., the CRS) and synchronization signals (e.g., the PSS and SSS). A transmit (TX) multiple-input multiple-output (MIMO) processor 1130 may perform spatial processing (e.g., precoding) on the data symbols, the control symbols, the overhead symbols, and/or the reference symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and/or other base stations and may provide received signals to demodulators (DEMODs) 1154a through 1154r, respectively. Each demodulator 1154 may condition (e.g., filter, amplify, downconvert, and digitize) its received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for UE 120 to a data sink 1160, and provide decoded control information and overhead information to a controller/processor 1180.

On the uplink, at UE 120, a transmit processor 1164 may receive and process data from a data source 1162 and control information from controller/processor 1180. Processor 1164 may also generate reference symbols for one or more reference signals. The symbols from transmit processor 1164 may be precoded by a TX MIMO processor 1166 if applicable, further processed by modulators 1154a through 1154r (e.g., for SC-FDM, OFDM, etc.), and transmitted to base station 110. At base station 110, the uplink signals from UE 120 and other UEs may be received by antennas 1134, processed by demodulators 1132, detected by a MIMO detector 1136 if applicable, and further processed by a receive processor 1138 to obtain decoded data and control information sent by UE 120. Processor 1138 may provide the decoded data to a data sink 1139 and the decoded control information to controller/processor 1140.

Controllers/processors 1140 and 1180 may direct the operation at base station 110 and UE 120, respectively. Processor 1140 and/or other processors and modules at base station 110 may perform or direct process 700 in FIG. 7 and/or other processes for the techniques described herein. Processor 1180 and/or other processors and modules at UE 120 may perform or direct process 900 in FIG. 9 and/or other processes for the techniques described herein. Memories 1142 and 1182 may store data and program codes for base station 110 and UE 120, respectively. A scheduler 1144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
declaring a set of subframes as multicast/broadcast single frequency network (MBSFN) subframes or regular subframes for first user equipments (UEs);
sending signaling to convey the set of subframes as the MBSFN subframes or the regular subframes;
dynamically selecting formats of the set of subframes for second UEs, the format of each subframe being selected from a plurality of formats, wherein the formats of the set of subframes are dynamically selected for the second UEs without sending signaling to convey the selected formats to the second UEs; and
sending transmissions in the set of subframes based on the selected formats.

2. The method of claim 1, wherein the plurality of formats comprise at least one regular subframe format, or at least one MBSFN subframe format, or at least one blank subframe format, or at least one new subframe format, or a combination thereof.

3. The method of claim 2, wherein the at least one regular subframe format comprises a first regular subframe format having a cell-specific reference signal (CRS) sent in four symbol periods of a subframe, or a second regular subframe format having a CRS sent in six symbol periods of a subframe, or both.

4. The method of claim 2, wherein the at least one MBSFN subframe format comprises a first MBSFN subframe format having a cell-specific reference signal (CRS) sent in one symbol period of a subframe, or a second MBSFN subframe format having a CRS sent in two symbol periods of a subframe, or both.

5. The method of claim 1, wherein the dynamically selecting the formats of the set of subframes comprises selecting the formats of the set of subframes on a per subframe basis.

6. The method of claim 1, further comprising:
declaring the set of subframes as the MBSFN subframes for the first UEs; and
sending the signaling to convey the set of subframes as the MBSFN subframes.

7. The method of claim 6, wherein the sending transmissions in the set of subframes comprises sending a cell-specific reference signal (CRS) in each subframe in the set of subframes based on an MBSFN subframe format.

8. The method of claim 1, wherein the plurality of formats comprise at least one regular subframe format and at least one MBSFN subframe format, and wherein the dynamically selecting the formats of the set of subframes comprises selecting an MBSFN subframe format or a regular subframe format of each subframe in the set of subframes.

9. The method of claim 1, wherein the plurality of formats comprise at least one MBSFN subframe format and at least one blank subframe format, and wherein the dynamically selecting the formats of the set of subframes comprises selecting an MBSFN subframe format or a blank subframe format of each subframe in the set of subframes based on a number UEs expecting to receive an MBSFN subframe, or level of activity of the UEs, or both.

10. The method of claim 1, wherein the set of subframes is designated as the regular subframes for the first UEs and is configured as MBSFN subframes, or blank subframes, or new subframes, or a combination thereof for the second UEs.

11. The method of claim 10, wherein the dynamically selecting the formats of the set of subframes for the second UEs comprises reconfiguring a subframe in the set of subframes as a regular subframe.

12. The method of claim 10, further comprising:
receiving a page for one of the first UEs;
reconfiguring a subframe in the set of subframes as a regular subframe in response to receiving the page; and
sending the page in the subframe to the one of the first UEs.

13. The method of claim 10, further comprising:
placing one of the first UEs in a discontinuous reception (DRX) mode prior to each subframe in the set of subframes.

14. The method of claim 10, wherein the set of subframes includes at least one of subframes 0, 4, 5 and 9 for frequency division duplexing (FDD) or at least one of subframes 0, 1, 5 and 6 for time division duplexing (TDD).

15. An apparatus for wireless communication, comprising:
means for declaring a set of subframes as multicast/broadcast single frequency network (MBSFN) subframes or regular subframes for first user equipments (UEs);
means for sending signaling to convey the set of subframes as the MBSFN subframes or the regular subframes;
means for dynamically selecting formats of the set of subframes for second UEs, the format of each subframe being selected from a plurality of formats, wherein the formats of the set of subframes are dynamically selected for the second UEs without sending signaling to convey the selected formats to the second UEs; and
means for sending transmissions in the set of subframes based on the selected formats.

16. The apparatus of claim 15, wherein the plurality of formats comprise at least one regular subframe format, or at least one MBSFN subframe format, or at least one blank subframe format, or at least one new subframe format, or a combination thereof.

17. The apparatus of claim 15, wherein the means for dynamically selecting the formats of the set of subframes comprises means for selecting the formats of the set of subframes on a per subframe basis.

18. The apparatus of claim 15, further comprising:
means for declaring the set of subframes as the MBSFN subframes for the first UEs.

19. The apparatus of claim 15, wherein the set of subframes is designated as the regular subframes for the first UEs and is configured as MBSFN subframes, or blank subframes, or new subframes, or a combination thereof for the second UEs.

20. An apparatus for wireless communication, comprising:
at least one processor configured to declare a set of subframes as multicast/broadcast single frequency network (MBSFN) subframes or regular subframes for first user equipments (UEs), to send signaling to convey the set of subframes as the MBSFN subframes or the regular subframes, to dynamically select formats of the set of subframes for second UEs, the format of each subframe being selected from a plurality of formats, wherein the formats of the set of subframes are dynamically selected for the second UEs without sending signaling to convey the selected formats to the second UEs, and to send transmissions in the set of subframes based on the selected formats.

21. The apparatus of claim 20, wherein the plurality of formats comprise at least one regular subframe format, or at least one MBSFN subframe format, or at least one blank subframe format, or at least one new subframe format, or a combination thereof.

22. The apparatus of claim 20, wherein the at least one processor is configured to select the formats of the set of subframes on a per subframe basis.

23. The apparatus of claim 20, wherein the at least one processor is configured to declare the set of subframes as the MBSFN subframes for the first UEs, and to dynamically select the formats of the set of subframes for the second UEs.

24. The apparatus of claim 20, wherein the set of subframes is designated as the regular subframes for the first UEs and is configured as MBSFN subframes, or blank subframes, or new subframes, or a combination thereof for the second UEs.

25. A computer program product, comprising:
a non-transitory computer-readable medium comprising:
code for causing at least one computer to declare a set of subframes as multicast/broadcast single frequency network (MBSFN) subframes or regular subframes for first user equipments (UEs);
code for causing at least one computer to send signaling to convey the set of subframes as the MBSFN subframes or the regular subframes;
code for causing at least one computer to dynamically select formats of the set of subframes for second UEs, the format of each subframe being selected from a plurality of formats, wherein the formats of the set of subframes are dynamically selected for the second UEs without sending signaling to convey the selected formats to the second UEs, and
code for causing the at least one computer to send transmissions in the set of subframes based on the selected formats.

26. A method for wireless communication, comprising:
receiving a subframe having a format dynamically selected from a plurality of formats, wherein the subframe is declared as a multicast/broadcast single frequency network (MBSFN) subframe or a regular subframe for first user equipments (UEs) and is dynamically configurable for second UEs;
receiving, at a second UE, no signaling indicating the format of the dynamically configurable subframe, wherein a first UE receives signaling to convey the subframe as the MBSFN subframe or the regular subframe; and
processing the subframe based on at least one of the plurality of formats to recover at least one transmission sent in the subframe.

27. The method of claim 26, wherein the plurality of formats comprise at least one regular subframe format, or at least one MBSFN subframe format, or at least one blank subframe format, or at least one new subframe format, or a combination thereof.

28. The method of claim 26, wherein the subframe is declared as the MBSFN subframe for the first UEs.

29. The method of claim 26, wherein the subframe is designated as the regular subframe for the first UEs and is configured as an MBSFN subframe, or a blank subframe, or a new subframe for the second UEs.

30. The method of claim 26, wherein the processing the subframe comprises:
processing the subframe based on one of the plurality of formats at a time, and
terminating processing of the subframe when the at least one transmission is recovered from the subframe.

31. The method of claim 26, wherein the processing the subframe comprises:
processing a first portion of the subframe to detect for a downlink grant for a UE, processing a second portion of the subframe based on the downlink grant if obtained from the first portion of the subframe, and skipping the second portion of the subframe if the downlink grant is not obtained from the first portion of the subframe.

32. An apparatus for wireless communication, comprising:

means for receiving a subframe having a format dynamically selected from a plurality of formats, wherein the subframe is declared as a multicast/broadcast single frequency network (MBSFN) subframe or a regular subframe for first user equipments (UEs) and is dynamically configurable for second UEs;

means for receiving, at a second UE, no signaling indicating the format of the dynamically configurable subframe, wherein a first UE receives signaling to convey the subframe as the MBSFN subframe or the regular subframe; and means for processing the subframe based on at least one of the plurality of formats to recover at least one transmission sent in the subframe.

33. The apparatus of claim 32, wherein the means for processing the subframe comprises:

means for processing the subframe based on one of the plurality of formats at a time, and means for terminating processing of the subframe when the at least one transmission is recovered from the subframe.

34. The apparatus of claim 32, wherein the means for processing the subframe comprises:

means for processing a first portion of the subframe to detect for a downlink grant for a UE, means for processing a second portion of the subframe based on the downlink grant if obtained from the first portion of the subframe, and means for skipping the second portion of the subframe if the downlink grant is not obtained from the first portion of the subframe.

35. An apparatus for wireless communication, comprising:

at least one processor configured to receive a subframe having a format dynamically selected from a plurality of formats, wherein the subframe is declared as a multicast/broadcast single frequency network (MBSFN) subframe or a regular subframe for first user equipments (UEs) and is dynamically configurable for second UEs, to receive, at a second UE no signaling indicating the format of the dynamically configurable subframe, wherein a first UE receives signaling to convey the subframe as the MBSFN subframe or the regular subframe, and to process the subframe based on at least one of the plurality of formats to recover at least one transmission sent in the subframe.

36. The apparatus of claim 35, wherein the plurality of formats comprise at least one regular subframe format, or at least one MBSFN subframe format, or at least one blank subframe format, or at least one new subframe format, or a combination thereof.

37. The apparatus of claim 35, wherein the processor is configured to declare the subframe as the MBSFN subframe for the first UEs.

38. The apparatus of claim 35, wherein the subframe is designated as the regular subframe for first UEs and the subframe is configured as an MBSFN subframe, or a blank subframe, or a new subframe for the second UEs.

39. The apparatus of claim 35, wherein the processor is further configured to:

process the subframe based on one of the plurality of formats at a time, and terminate processing of the subframe when the at least one transmission is recovered from the subframe.

40. The apparatus of claim 35, wherein the process the subframe comprises:

process a first portion of the subframe to detect for a downlink grant for a UE, process a second portion of the subframe based on the downlink grant if obtained from the first portion of the subframe, and skip the second portion of the subframe if the downlink grant is not obtained from the first portion of the subframe.

41. A computer program product, comprising:

a non-transitory computer-readable medium comprising:

code for causing at least one computer to receive a subframe having a format dynamically selected from a plurality of formats, wherein the subframe is declared as a multicast/broadcast single frequency network (MBSFN) subframe or a regular subframe for first user equipments (UEs) and is dynamically configurable for second UEs, code for causing at least one computer to receive, at a second UE, no signaling indicating the format of the dynamically configurable subframe, wherein a first UE receives signaling to convey the subframe as the MBSFN subframe or the regular subframe, and code for causing the at least one computer to process the subframe based on at least one of the plurality of formats to recover at least one transmission sent in the subframe.

* * * * *